United States Patent

Dietrich et al.

[11] 3,992,263
[45] Nov. 16, 1976

[54] PROCESS FOR THE PREPARATION OF MOENOMYCIN

[75] Inventors: Jürgen Dietrich, Hofheim, Taunus; Miroslav Mracek; Dieter Sukatsch, both of Frankfurt am Main; Georg Nesemann, Lorsback, Taunus, all of Germany

[73] Assignee: Hoechst Aktiengesellschaft, Frankfurt am Main, Germany

[22] Filed: July 21, 1975

[21] Appl. No.: 597,668

[30] Foreign Application Priority Data

July 23, 1974 Germany............................ 2435260

[52] U.S. Cl.............................. 195/80 R; 195/114
[51] Int. Cl.$^2$............................................ C12D 9/14
[58] Field of Search........................... 195/80 R, 114

[56] References Cited
UNITED STATES PATENTS 3,483,088  12/1969  Seeley................................. 195/114

3,674,866  7/1972  Linder et al....................... 195/80 R

FOREIGN PATENTS OR APPLICATIONS 1,210,514  2/1966  Germany........................... 195/80 R

*Primary Examiner*—Lionel M. Shapiro
*Attorney, Agent, or Firm*—Curtis, Morris & Safford

[57] ABSTRACT

In a process for preparing Moenomycin by the aerobic fermentation of Moenomycin-forming Streptomyces in the presence of fats, the improvement wherein a surfactant of the formula

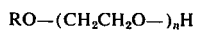

$$RO-(CH_2CH_2O-)_nH$$

is present in the fermentation medium, R being saturated or monounsaturated hydrocarbon having 8 to 18 carbon atoms and, in each case, optionally being substituted by hydroxy, and $n$ is an integer from 18 to 30.

1 Claim, No Drawings

PROCESS FOR THE PREPARATION OF MOENOMYCIN

The present invention provides a process for the preparation of Moenomycin.

According to German Pat. No. 1,210,514 a process for the preparation of Moenomycin by microbiological fermentation of Moenomycin-forming Streptomyces is known, in which process use is made of fats as an additional carbon source.

The present invention provides a process for the prepartion of Moenomycin by way of microbiological fermentation of Moenomycin-forming Streptomyces in the usual biological manner and in the presence of fats, which comprises adding to the fermentation medium a non-ionogenic surfactant of the general formula (1)

$$R-O-(CH_2-CH_2-O-)_nH \quad (1)$$

wherein R represents a saturated or mono-unsaturated hydrocarbon radical having from 8 to 18 carbon atoms and optionally carrying in each case a hydroxy group, and n stands for an integer of from 18 to 30.

The hydrocarbon radicals R are preferably straight-chained; however, they may contain up to about 20 % of branched portions, especially in the case of radicals of synthetic origin. Preference is given in particular to hydrocarbon radicals with from 10 to 14 carbon atoms.

In the general formula (1), R stands especially for octyl, nonyl, decyl, undecyl, dodecyl, tridecyl, tetradecyl, pentadecyl, hexadecyl, heptadecyl, octadecyl, as well as octenyl, nonenyl, decenyl, undecenyl, dodecenyl, tridecenyl, tetradecenyl, pentadecenyl, hexadecenyl, heptadecenyl, and octadecenyl, moreover, hydroxy-octyl, hydroxy-nonyl, hydroxy-decyl, hydroxy-undecyl, hydroxy-dodecyl, hydroxy-tridecyl, hydroxy-tetradecyl, hydroxy-pentadecyl, hydroxy-heptadecyl, as well as hydroxy-octadecyl. In all of the above-mentioned radicals, the hydroxy group may be present at the first, second, third, etc. up to the last but one carbon atom: from $C_1$ to $C_7$ in the case of the octyl radical, from $C_1$ to $C_8$ for the nonyl radical, from $C_1$ to $C_9$ for the decyl radical, from $C_1$ to $C_{10}$ for the undecyl radical, from $C_1$ to $C_{11}$ for the dodecyl radical, from $C_1$ to $C_{12}$ for the tridecyl radical, from $C_1$ to $C_{13}$ for the tetradecyl radical, from $C_1$ to $C_{14}$ for the pentadecyl radical, from $C_1$ to $C_{15}$ for the hexadecyl radical, from $C_1$ to $C_{16}$ for the heptadecyl radical, and from $C_1$ to $C_{17}$ for the octadecyl radical.

With regard to the position of the hydroxy group in the molecule, preference is given to those compounds which are most easily accessible in practice, for example 12-hydroxy-$\Delta$-9,10-octadecenoic acid, or 12-hydroxy-$\Delta$-6,7-octadecenoic acid, or 12-hydroxy-$\Delta$-9,10-tetradecenoic acid, or 12-hydroxy-$\Delta$-5,6-tetradecenoic acid.

As mono-unsaturated hydrocarbon radicals standing for R, there may be mentioned $\Delta$-4,5-decenyl,$\Delta$-9,10-decenyl,$\Delta$-4,5-dodecenyl,$\Delta$-5,6-tetradecenyl,$\Delta$-9,10-tetradecenyl,$\Delta$-9,10-hexadecenyl,$\Delta$-6,7-octadecenyl,$\Delta$-9,10-octadecenyl, and $\Delta$-11,12-octadecenyl; in all of the above-mentioned unsaturated hydrocarbon radicals, a hydroxyl group may in addition be present on any of the carbon atoms not carrying a double bond. All the unsaturated hydrocarbon radicals mentioned may be present in the cis- as well as in the trans-configuration. Preference is given to those configurations which occur naturally. The same is true for the positions of the double bonds.

Among the surfactants of the general formula (1), preference is given in particular to those, the molecular weight of which is in the range of from 1000 to 1500, the turbidity point of which (1 gram of substance in 100 ml of sodium chloride solution of 10 % strength) is from 73 to 79, the hydroxy number of which is from 39 to 78, and the hydrophilic-lipophilic balance value of which is from 16 to 18.

Among the particularly preferred surfactants of the formula I, those substances have proved to be extremely suitable, in which, on one hand, n stands for the number 25 and R represents a mixture of from 6 to 9 % of octyl, from 5 to 7 % of decyl, from 48 to 54 % of dodecyl, from 18 to 20 % of tetradecyl, from 7 to 9 % of hexadecyl and from 8 to 10 % of octadecyl, and in which — on the other hand — n stands for the numbers 18, 20 or 22 and R represents dodecyl.

The above-mentioned surfactants are prepared by way of oxalkylation, particularly oxethylation, of corresponding fat alcohols in an alkaline medium, with different amounts of ethylene oxide.

The fermentation of the Streptomyces is carried out under aerobic conditions in an aqueous medium containing as a carbon source, besides inorganic salts, starch, glucose, cane sugar or molasses and, in addition, an animal, vegetable or synthetic fat, and containing, as a nitrogen source, soy groats or soy meal, corn-steep liquor, yeast extract, cotton seed meal or cotton seedling meal, nitrates or ammonium salts, as well as a surfactant of the formula (1).

The fermentation is carried out until a maximum antibiotic activity is reached. The latter can be determined by measuring the concentration of the dissolved nitrogen in the fermentation medium or the dry matter formed.

After the maximum antibiotic activity has been reached, the fermentation is interrupted. In order to isolate the antibiotic, either the entire culture is homogenized and subsequently extracted, or the mycelium is separated from the culture solution by centrifuging and these two components are then extracted separately. As extracting agents there may be mentioned preferably solvents which can be mixed with water or which are partially miscible, for example, methanol, ethanol, propanol, butanol, ethylene-glycol-monomethylether, acetone or dioxane.

From the extracts thus prepared, the raw antibiotic is obtained advantageously by evaporation of the solvents under reduced pressure. For further purification, the residue is extracted with hot polar organic solvents, for example methanol, and the antibiotic is precipitated from the extract, concentrated under reduced pressure, by precipitation with a moderately polar organic solvent such as diethylether, diisopropylether or ethylacetate.

As Moenomycin-forming Streptomyces there are used Streptomyces ghanaensis ATCC 14,672, Streptomyces bambergiensis ATCC 13,879, Streptomyces ederensis ATCC 15,304, and Streptomyces geysiriensis ATCC 15,303, as well as their mutants and revertants.

As animal fats there are mentioned advantageously fats such as lard or mutton tallow, or synthetically prepared fractions of those fats with a defined carbon content. As vegetable fats there are used advantageously fat oils such as olive oil, sunflower oil, peanut oil, coconut oil, and castor oil. There are to be mentioned also synthetic fats, such as oleic acid-trigylceride or stearic acid-triglyceride. All fats are used in a concentration of from 0.1 to 16 % by weight, preferably from 2 to 5 % by weight.

The fact that the addition — according to the invention — of a surfactant of the general formula (1) strongly promotes the formation of Moenomycin from Streptomyces strains was surprising and could not have been foreseen. It is true that the stimulating effect of, for example, polyoxyethylene derivatives of sorbitan anhydrides, which have been partially esterified with fatty acid (Tween types), or of sugar fatty acid esters on the enzyme production of certain microorganisms has been known (E. T. Reese et al., Applied Microbiology, 1969, 242–245), as well as on the formation of riboflavin from Ashbya gossypii (C. G. Smith et al., Biochim. Biophys. Acta 47 (1961) 344–349). However, these surface-active compounds do not have a positive effect on the formation of Moenomycin. On the other hand, the compounds promoting the formation of Moenomycin corresponding to the general formula (1) do not have a positive effect on the formation of Streptomycin, for example.

The following Examples serve to illustrate the invention.

EXAMPLES

In a 300 ml Erlenmeyer flask, Streptomyces ghanaensis ATCC 14.672 was inoculated on 30 ml of a sterile nutrient medium having the following composition:
4.0 % of glucose
3.0 % of soy meal
0.3 % of slops, dry
0.25 % of common salt
0.25% of calcium carbonate
water ad 30 ml.

After the inoculation the preliminary culture was shaken, with a frequency of 300 revolutions per minute, for two days at a temperature in the range of from 28° to 30° C.

The fermentation medium of the main culture had the following composition:
3.0 % of soy oil
3.0 % of soy meal
3.0 % of corn starch
1.0 % of saccharose
0.3 % of ammonium sulfate
0.4 % of calcium carbonate
2.0 % of yeast
water ad 30 ml.

The addition of one of the surfactants specified in the following Table 1 to the fermentation medium was effected in the form of a 10 % by weight aqueous solution with twice-distilled water. Subsequently the solution was sterilized for 10 minutes at a temperature in the range of from 123° to 127° C.

The fermentation medium mentioned above was then mixed with 1.5 ml of the surfactant solution of 37° C. Subsequently 5 ml of the preliminary culture were added.

This main culture was shaken with from 260 to 300 revolutions/minute for 120 hours, at a temperature in the range of from 28° to 30° C.

Subsequently the reaction mixture was agitated with 60 ml of methanol for 2 minutes in a vibration mixer and was then filtered by means of a folded filter. In an aliquot portion of the filtrate, the Moenomycin content ws determined turbidimetrically by its effect on a standardized culture of Staphylococcus aureus, as compared to the effect of a Moenomycin solution having a known content of this substance.

The other results shown in the Table below have been obtained by varying the Streptomyces strains, the addition of fat and the addition of the surfactant, the other conditions being the same.

The surfactants specified in the following Table have the following characteristic data, the molecular weight being expressed by MW, the turbidity point by TP, the hydroxyl number by HN, and the hydrophilic-lipophilic balance value by HLB:

|  | n | MW | TP | HN | HLB |
|---|---|---|---|---|---|
| Mixture A | 20 : | 1070 | 77 | 53 | 16.2 |
| Mixture A | 25 : | 1290 | 78 | 44 | 16.8 |
| Mixture B | 25 : | 1260 | 77 | 43 | 17.5 |
| Dodecyl | 20 : | 1000 | 79 | 56 | 16.5 |
| Dodecyl | 30 : | 1430 | 78 | 39 | 17.5 |

TABLE

| Fermentation with Streptomyces | Fat | Hydrocarbon radical R | n | Moenomycin yield |
|---|---|---|---|---|
| Str.bambergiensis | Soy oil | — | — | 100 % |
| Str.bambergiensis | Soy oil | Mixture A from 7 % $C_8$ 6 % $C_{10}$ 51 % $C_{12}$ 19 % $C_{14}$ 8 % $C_{16}$ 9 % $C_{18}$ | 20 | 161 % |
| Str.bambergiensis | Soy oil | Mixture A | 25 | 180 % |
| Str.bambergiensis | Soy oil | Mixture B from 13 % $C_9$ 32 % $C_{10}$ 20 % $C_{11}$ 10 % $C_{12}$ 14 % $C_{13}$ 10 % $C_{14}$ 3 % $C_{15}$ | 25 | 155 % |
| Str.bambergiensis | Coconut oil | Dodecyl | 30 | 165 % |
| Str.bambergiensis | Glycerin trioleate | Mixture A | 20 | 200 % |
| Str.bambergiensis | Glycerin trioleate | Dodecyl | 30 | 190 % |
| Str.bambergiensis | Glycerin trioleate | Dodecyl | 20 | 202 % |
| Str.bambergiensis | Castor oil | Mixture A | 25 | 205 % |
| Str.ghanaensis | Soy oil | — | — | 100 % |
| Str.ghanaensis | Soy oil | Mixture A | 20 | 158 % |
| Str.ghanaensis | Coconut oil | Dodecyl | 30 | 160 % |
| Str.ghanaensis | Glycerin trioleate | Mixture A | 20 | 158 % |
| Str.ghanaensis | Glycerin trioleate | Dodecyl | 30 | 173 % |
| Str.ghanaensis | Glycerin trioleate | Dodecyl | 20 | 158 % |
| Str.ghanaensis | Castor oil | Mixture A | 25 | 150 % |
| Str.geysiriensis | Soy oil | — | — | 100 % |
| Str.geysiriensis | Soy oil | Mixture A | 20 | 155 % |
| Str.geysiriensis | Coconut oil | Dodecyl | 30 | 150 % |
| Str.geysiriensis | Glycerin trioleate | Mixture A | 20 | 160 % |
| Str.geysiriensis | Glycerin trioleate | Dodecyl | 30 | 155 % |
| Str.geysiriensis | Glycerin trioleate | Dodecyl | 20 | 160 % |
| Str.geysiriensis | Castor oil | Mixture A | 25 | 145 % |
| Str.ederensis | Soy oil | — | — | 100 % |
| Str.ederensis | Soy oil | Mixture A | 20 | 152 % |
| Str.ederensis | Coconut oil | Dodecyl | 30 | 140 % |
| Str.ederensis | Glycerin trioleate | Mixture A | 20 | 145 % |
| Str.ederensis | Glycerin trioleate | Dodecyl | 30 | 150 % |
| Str.ederensis | Glycerin trioleate | Dodecyl | 20 | 155 % |

TABLE-continued

| Fermentation with Streptomyces | Fat | Hydrocarbon radical R | n | Moenomycin yield |
|---|---|---|---|---|
| Str.ederensis | Castor oil | Mixture A | 25 | 140 % |

We claim:

1. In a process for the preparation of Moenomycin by the aerobic fermentation of *Streptomyces ghanaensis* ATCC 14,672; *Streptomyces bambergiensis* ATCC 13,879; *Streptomyces ederensis* ATCC 15,304; *Streptomyces geysiriensis* ATCC 15,303; or their revertants or mutants in a fermentation medium containing a fat, the improvement wherein a surfactant of the formula $$RO-(CH_2CH_2O-)_nH$$

is additionally present in the fermentation medium, said surfactant being a mixture wherein $n$ is 25 and R is 6 to 9 percent octyl, 5 to 7 percent decyl, 48 to 54 percent dodecyl, 18 to 20 percent tetradecyl, 7 to 9 percent hexadecyl, and 8 to 10 percent octadecyl, or being oxethylated dodecyl wherein $n$ is 18, 20, or 22.

* * * * *